United States Patent Office 3,711,333
Patented Jan. 16, 1973

3,711,333
FUEL CELL BATTERY
Hans Kohlmuller, Erlangen, Germany, assignor to
Siemens Aktiengesellschaft
Filed Sept. 2, 1971, Ser. No. 177,299
Claims priority, application Germany, Sept. 5, 1970,
P 20 44 068.0
Int. Cl. H01m 27/00
U.S. Cl. 136—86 R                    6 Claims

ABSTRACT OF THE DISCLOSURE

A fuel cell battery is divided into several electrically series connected blocks of fuel cells. These blocks and the individual fuel cells within each block are connected with lines for an electrolyte-hydrazine fuel mixture and the gaseous oxidation agent, whereby during the operation of the fuel battery, the fuel cell elements within each block are traversed in parallel by the gaseous oxidation agent, while the individual blocks are traversed in series. All the fuel cells of the fuel cell battery are passed in parallel by the mixture of electrolyte-hydrazine. The number of the fuel cells decreases per block, in flow direction of the gaseous oxidation agent and the flow rate of the gas in the oxidation agent supply line may be regulated by a valve situated at the gas outlet of the fuel cell battery, said valve being controllable by electrical signals obtained from a voltage comparison between various blocks.

---

Figure 1:
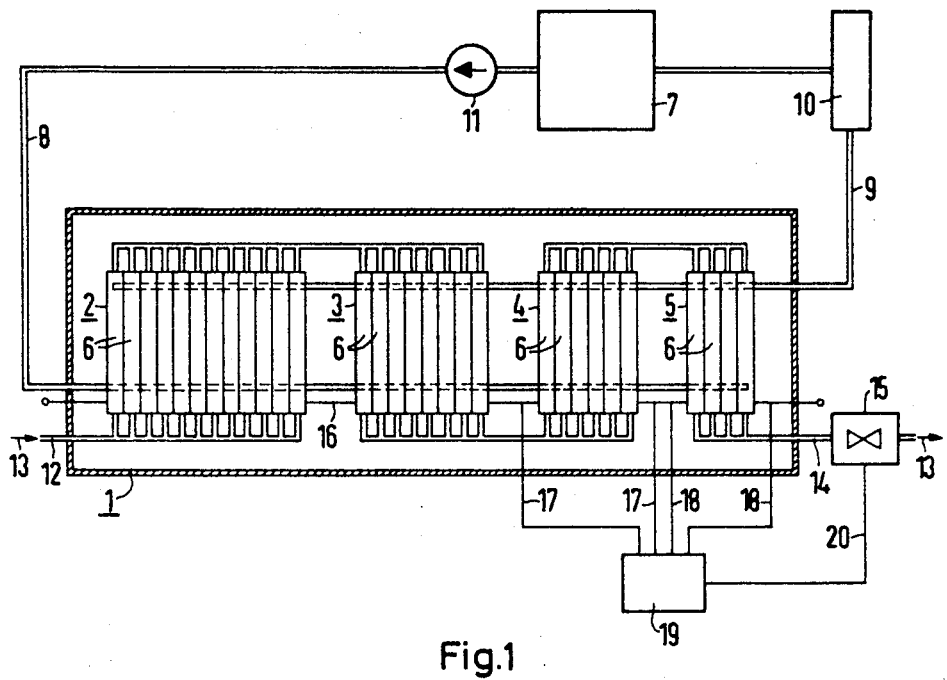

The present invention relates to a fuel cell battery comprising a plurality of fuel cells for reacting hydrazine, dissolved in a liquid electrolyte with gaseous oxygen or gaseous oxygen containing oxidation agents, and to a method for operating such a fuel battery.

In addition to gaseous fuels, liquid fuels, such as methanol and hydrazine, can also be used in fuel cells. Fuel cells and fuel cell batteries using hydrazine as fuel are described, for example, in the periodical Chemie-Ingenieur-Technik, Vol. 41 (1969), pages 765 to 773. Used as oxidation agents are air, oxygen and hydrogen peroxide. The hydrazine fuel is dissolved in a predominantly alkaline electrolyte. The following gross reactions take place in a hydrazine-oxygen fuel cell. The anodic oxidation of hydrazine is carried out according to:

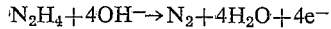

and the cathodic reduction of the oxygen in the alkaline electrolyte is according to:

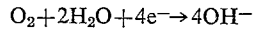

This results, for the energy supplying overall process of oxidizing hydrazine with oxygen in the equation:

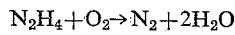

Water and nitrogen occur, during the conversion. The water dilutes the electrolyte and is removed from the same, if necessary. The nitrogen occurring at the anode also accumulates in the electrolyte and is separated in a gas trap.

One difficulty connected with the hydrazine oxygen fuel cell is that at the oxygen electrode, that is the cathode, which is in contact with the alkaline hydrazine solution, hydrazine oxidation may also occur in addition to the reduction of oxygen. The cathode is separated by an electrolyte permeable diaphragm, from the electrolyte hydrazine mixture in order to reduce the hydrazine concentration in front of the cathode. This diaphragm, however, does not produce a complete separation so that a chemical shortcircuit is feasible within the fuel cell, via diffusion of the hydrazine through the diaphragm, to the oxygen electrode. This shortcircuit results in an oxidation of the hydrazine at the cathode and, according to the aforeindicated equation, nitrogen and water result from the hydrazine and oxygen. In another reaction, the hydrazine may dissociate at the cathode with formation of ammonia. Finally, the polarization increases at said electrode due to the occurrence of a mixed potential as a result of the diffusion of hydrazine to the cathode.

The gaseous products, such as ammonia, and above all, nitrogen, which occur from the undesired secondary reactions, accumulate in the cathode, which consists of porous material. The gas cushions which occur thereby make more difficult the access of the oxygen containing oxidation agent to the cathode and the electrochemical reaction of the oxygen at the three phase boundary gas electrolyte liquid electrode material. As a result, the characteristic curves of the cathode worsen.

In order to prevent this, care is taken in the known fuel cell so that the gaseous reaction products are quickly removed from the cathode. To this end, a surplus gaseous oxidation agent is passed along the cathode thus rinsing out the reaction products. This means, however, that a considerable amount of the oxygen contained in the oxidation agent is not utilized for electro-chemical reaction and that, as a result, a low Faraday effect is obtained with respect to the oxidation agent.

The described poor utilization of the oxidation agent and the resultant low Faraday effect also occurs in hydrazine fuel batteries consisting of a plurality of such fuel elements in which the oxidation agent passes the individual fuel cells in parallel. Another detrimental factor, which is observed is that that oxidation agent passes the fuel cell battery with constant flow rate, without affording the opportunity of dosing the oxidation agent in dependence upon the amount that is required for electrochemical reaction.

If, on the other hand, fuel cells which are combined in a hydrazine fuel cell battery are passed by the oxidation agent in series, then a higher flow resistance and a correlated pressure drop make themselves felt to disadvantage. In addition, a great accumulation of reaction products, primarily of nitrogen, occurs in the oxidation agent so that the fuel cells passed last are often inadequately provided with oxidation agents.

It is an object of the present invention to avoid the afore-said disadvantages, in a fuel cell battery with a plurality of fuel cells for the reaction of hydrazine dissolved in a liquid electrolyte, with gaseous oxygen or oxygen containing gases used as the oxidation agent. In order to obtain a high Faraday effect, the best possible utilization of the gaseous oxidation agent should be obtained while maintaining the power of the fuel battery even when operational conditions change by insuring an adequate supply of gaseous oxidation agents for the fuel cells of the battery.

In accordance with the invention, the fuel cell battery is divided into several electrically series connected blocks of fuel cells, these blocks and the individual fuel cells within each block are connected with lines for the electrolyte hydrazine mixture and the gaseous oxidation agent, so that during the operation of the fuel battery, the fuel cell elements within each block are traversed in parallel by the gaseous oxidation agent, while the individual blocks are traversed in series. All the fuel cells of the fuel cell battery are passed in parallel by the mixture of electrolyte hydrozine. The number of the fuel cells decreases per block, in flow direction of the gaseous oxidation agent and the flow rate of the gas in the oxidation agent supply line may be regulated by a valve situated at the gas outlet of the fuel cell battery, said valve being controllable by electrical signals obtained from a voltage comparison between various blocks.

The fuel cell battery of the present invention has a plurality of advantages. All fuel cells of the fuel cell battery are passed in parallel by the electrolyte hydrazine mixture and therefor are uniformly supplied with the hydrazine fuel. This also applies, when due to a change in electrical charges of the battery, the hydrazine supply must be freshly regulated. Special advantages are gained from the arrangement of the invention of the individual fuel cells in the fuel battery and the different switching arrangement of the individual fuel cells with respect to the inlet of the oxidation agent. A plurality of fuel cells is combined in a block and these blocks are electrically connected in series. The division of the fuel cells contained in the battery in the individual blocks is so effected that the number of the fuel cells per block decreases in flow direction of the gaseous oxidation agent. Thus each subsequent block contains fewer fuel cells than the preceding one. The arrangement of individual fuel cells of the fuel battery into blocks with a decreasing number of fuel cells, may also be called a cascade.

The fuel cells are so arranged within each block that they are passed by the gaseous oxidation agent in parallel while the individual blocks are connected in series with respect to the oxidation agent. This helps to keep the flow resistance within supportable limits in the disclosed device, since not all fuel cells are being passed in series, but only the individual blocks. The gaseous, oxygen containing oxidation agent removes from each of the fuel cells, during its passage of the battery, the gaseous reaction products which occur at the cathode as a result of the above-described secondary reactions. Thus the oxidation agent accumulates more and more of said reaction products. If appropriate measures were not taken this would mean that in a battery where several fuel cells are connected in series, the lastly passed fuel cells would have the poorest supply of oxygen, since the gas mixture delivered to said fuel cells has the least percentage of oxygen. The same would apply for the last blocks of a battery, if each block would have the same number of fuel cells. The arrangement of the fuel cells in form of a cascade as in the battery according to the invention, counteracts the poor oxygen supply which is provided for the last fuel cells. The flow rate is higher in the last blocks of the battery according to the invention, due to the decrease in the number of the fuel cells than the rate would be in the last blocks of a battery wherein the blocks would have the same number of fuel cells. This design of the fuel cell battery in the form of a cascade, according to the invention, provides therefore sufficient oxygen to the fuel cells which are located at the end of the battery.

In the fuel battery according to the invention, the flow rate of the gas in the supply line for the oxidation agent, i.e. the mixture of introduced oxygen containing oxidation agent and absorbed gaseous reaction products, can be regulated by a valve, preferably a magnetic valve, provided at the gas outlet of the battery. This valve is controllable by electrical signals obtained during a voltage comparison between various blocks. The voltage comparison is preferably effected between the last block and a block situated prior to the last.

The opportunity to regulate the flow rate of the gas on the fuel cell battery makes it possible to adjust the flow rate and thus the oxygen supply to values that are required for maintaining a specific battery efficiency or output. Since this regulation, meaning the control of the valve, is effected through electrical signals obtained from a voltage comparison between various blocks of the battery and is so to speak controlled by the battery itself, an optimum utilization of the oxygen in the oxidation agent, i.e. a high Faraday effect, is assured.

The control of the valve, that regulates the flow rate is preferably done as follows: The voltages from two different blocks are electronically compared with each other after having considered the fact, through an appropriate voltage division or an appropriate selection of amplification factors of measuring amplifiers, that both blocks have a variable number of fuel cells connected electrically in series. Because of the electronic voltage comparison, an actual voltage, which is compared with a datum voltage, is obtained. The valve is then controlled independent on the difference between the datum and the actual voltage and is opened or closed, depending on the plus-minus sign of said difference.

The valve is preferably controlled also in a manner whereby the difference between the datum and the actual voltage changes the pulse width of pulses generated by a pulse generator, which have constant frequency and the thus obtained pulses of variable width are supplied to the control coil of a magnetic valve. By pulses with constant frequency, we mean pulses whose rise portion follows each other at a constant time interval.

The difference between the datum and the actual voltage may also be used to change the frequency of pulses produced by a pulse generator, which have a constant pulse width. Thus pulses with variable frequencies are supplied to the control coil of a magnetic valve. The advantage of these two control features of a magnetic valve is seen in the attainment of a quasi-proportional regulating process and in the avoidance of great fluctuations of the actual valve relative the datum value.

It is also of advantage that in order to regulate the flow rate to compare the voltage of blocks comprising a plurality of fuel cells, and not that of individual fuel cells. This helps to prevent faulty control of the valve, as a result of deviation by the individual fuel cells from the electrical curve.

Figure 2:
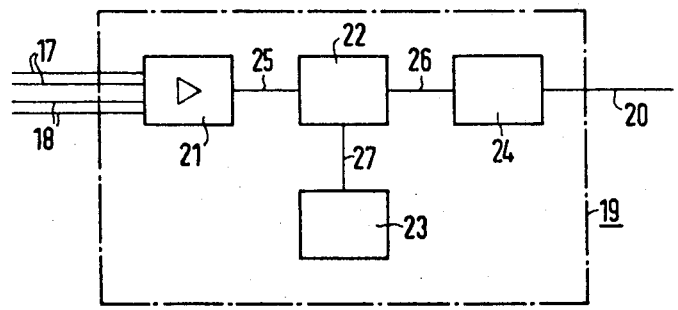

The invention will be more specifically disclosed with reference to an embodiment example shown schematically in the drawing, wherein:

FIG. 1 is the example of an embodiment of the fuel cell battery, according to the invention; and FIG. 2 shows a possible circuit diagram for control of the flow rate.

A fuel cell battery 1 comprising a total of 30 fuel cells, is divided into four blocks. The individual blocks, shown at 2, 3, 4 and 5 contain, sequentially, twelve, eight, six and four fuel cells 6. The fuel cells 6 are shown in a simplified manner in the figure. They resemble considerably in construction the fuel cell described in Austrian Pat. 274,082. The fuel cells each contain two electrodes of an area of, for example, 340 cm.²

The cathodes, for example, comprise pulverulent Raney silver and a butadiene-styrene-acrylonitrile copolymer binder. They have a coating of 170 mg. Raney silver/cm.² and are 0.7 mm. thick. Net electrodes coated with Raney nickel are used as anodes. The cathodes are separated from the electrolyte chamber by a 0.4 mm. thick, electrolyte permeable asbestos diaphragm. The electrolyte is 6$n$ KOH with 0.5 $m$ $N_2H_4$ as the fuel and is used at operating temperature of 40° C. The electrolyte hydrazine mixture, which is situated in the storage container 7, is supplied to the fuel battery 1, via line 8. The mixture passes all the fuel cells of the battery in parallel and emerges therefrom through line 9. The lines for the ingress and the egress of the electrolyte hydrazine mixture, within the battery are only shown as sketches in FIG. 1 and the inlet and outlet of the individual fuel cells are completely omitted for the sake of clarity. The nitrogen occurring at the anodes, during electro-chemical reaction in the battery, is removed from the battery by the mixture of electrolyte hydrazine and removed from the mixture in a nitrogen separator 10 and the mixture is again supplied to the storage container 7. A dosing device may be provided, at said storage container. Fresh hydrazine may be delivered to the mixture through the dosing device. The electrolyte hydrazine mixture is pumped, by pump 11, in a cycle through the battery 1.

Oxygen is supplied, as an oxidation agent, to the battery through the line 12, with the flow direction indicated by arrows 13. As illustrated in FIG. 1, the oxygen passes, in parallel, the fuel cells within the individual blocks, while the blocks themselves, with respect to oxygen supply, are connected in series. Oxygen is consumed during the electro-chemical reaction in the fuel cells. During the secondary reactions, nitrogen is primarily being formed at the cathode and is removed from said fuel cells by oxygen. The resultant nitrogen-oxygen mixture leaves the battery via the line 14. In this tubular line 14, at the gas outlet of the battery, is a regulating device 15, for the flow rate. This regulating device comprises a magnetic valve, actuated by a coil. The four blocks 2, 3, 4 and 5 of the battery are connected electrically in series, as indicated by line 16. The voltages are tapped from the last two blocks 4 and 5, respectively, having six and four fuel cells through lines 17 and 18 and are compared in the regulator 19. The magnetic valve is then controlled, through regulator 19, by electrical signals.

FIG. 2 represents a block diagram for a regulator wherein the control of the valve is such that the difference between the datum and the actual voltage changes the width of the pulses with constant frequency produced by a pulse generator. The voltages that are tapped by two blocks, via leads 17 and 18, are first delivered to a difference amplifier 21, within the regulator 19. In this difference amplifier, the actual value is formed from the two voltages, following an appropriate voltage division and amplification and said actual value is transmitted via line 25 to a threshold stage 22. In this threshold stage 22, the actual value is compared with a predetermined datum value of a datum voltage and the difference between the datum and the actual values is used to change the width of pulses having constant frequency which are delivered to the threshold stage via line 27, by pulse generator 23. The electrical signals are then transferred from the threshold stage via the lead 26 to a driver stage 24 and amplified there. The amplified signals are subsequently delivered via lead 20 to the coil of the magnetic valve. The frequency of the pulses is preferable within a range of 0.1 Hz. and 1 Hz. At a frequency exceeding 1 Hz., the possibility of quick wear of the magnetic valve must be considered while at a frequency below 0.1 Hz. a quasiproportional regulating behavior is hard to attain.

The described fuel cell battery is charged with 20 a. for example, with about 60 ma./cm.$^2$. The voltage tapped by the block 4 is reduced proportionally within the regulator 19, at a voltage divider and then compared with the voltage tapped by block 5. The reduction is necessary since there are six cells in block 4, while only four cells are in block 5. During normal operation, both voltages are of equal magnitude and amount to about 4 v. However, if one of the parameters of the fuel cell battery is altered, the temperature of the electrolyte hydrazine mixture or the hydrazine concentration will be changed or if the battery is differently charged, the voltage of the block 5 will decrease faster than that of block 4, due to an increased nitrogen accumulation in the oxygen, when the passage oxygen is too low. This changes the actual voltage determined through a voltage comparison of both voltages and a difference to the datum value predetermined in regulator 19 is obtained. Depending to the plus-minus sign of the difference between the datum voltage and the actual voltage, the magnetic valve is either opened or closed. In the event the passage of oxygen through the last block is too low, the valve opens and the battery is provided with more oxygen.

The great advantage attainable with the fuel cell battery of the present invention is that the flow rate of this oxidation agent is adjusted directly and automatically by the battery. When there is a change in operational conditions the flow rate will change at once. This insures that the Faraday yield with respect to oxygen utilization is always around 80 to 90%.

In the fuel cell battery of the present invention, the blocks of fuel cells are electrically interconnected in series. The fuel cell elements within these blocks may also be electrically connected in series. The individual blocks may also be divided into several component blocks consisting of fuel cells electrically connected in parallel while the component blocks within each block are interconnected in series.

What is claimed is:

1. A fuel cell battery comprising a plurality of fuel cells for reacting hydrazine, dissolved in a liquid electrolyte, with gaseous oxygen or oxygen containing gases used as oxidation agent, which comprises a plurality of fuel cells, said fuel cells are divided into several blocks of fuel cell elements electrically connected in series, said blocks and the fuel cell elements within each block are connected to lines for introduction of electrolyte-hydrazine mixture and gaseous oxidation agent so that during operation of the fuel cell battery, the fuel cell elements within each block are traversed in parallel by the gaseous oxidation agent, while the individual blocks are traversed in series, all of the fuel cell elements of the fuel battery are traversed in parallel by the electrolyte-hydrazine mixture, the number of fuel cell elements decreases per block in the flow direction of the gaseous oxidation agent whereby the flow rate is higher in the last blocks of the battery than it otherwise would be due to the decrease in the number of fuel cells in said blocks and the flow of the gases in the oxidation agent supply line is regulated by a valve situated at the gas outlet of the fuel cell battery, said valve being controlled by electrical signals obtained by a voltage comparison between various blocks.

2. Fuel cell battery as claimed in claim 1 wherein the voltage comparison is effected between the last block and a block prior to that one.

3. Fuel cell battery as claimed in claim 2, wherein the valve is a magnetic valve.

4. Fuel cell battery as claimed in claim 1, wherein the valve is controlled in dependence on the difference between a predetermined datum voltage and an actual voltage, obtained through a voltage comparison between two blocks.

5. Fuel cell battery as claimed in claim 4, wherein pulses with constant frequency are produced by a pulse generator, the difference between the datum and the actual voltage changes the pulse width of said pulses, and said valve is a magnetic valve controllable by the pulses of variable pulse width.

6. Fuel cell battery as claimed in claim 4, wherein pulses with constant pulse width are produced by a pulse generator, the difference between the datum and the actual voltage changes the frequency of said pulses, and said valve is a magnetic valve controllable by the pulses of variable frequency.

References Cited

UNITED STATES PATENTS

| 3,256,116 | 6/1966 | Justi et al. | 136—86 B |
| 3,268,364 | 8/1966 | Cade et al. | 136—86 B |
| 3,351,492 | 11/1967 | Heyes et al. | 136—86 D |

WINSTON A. DOUGLAS, Primary Examiner

H. A. FEELEY, Assistant Examiner

U.S. Cl. X.R.

136—86 B